Patented Mar. 12, 1940

2,193,037

UNITED STATES PATENT OFFICE 2,193,037

AZO COMPOUNDS AND PROCESS FOR COLORING THEREWITH

James G. McNally and Joseph B. Dickey, Rochester, N. Y., assignors to Eastman Kodak Company, Rochester, N. Y., a corporation of New Jersey No Drawing. Application September 28, 1938, Serial No. 232,156

12 Claims. (Cl. 8—50)

This invention relates to the art of dyeing or coloring. More particularly, it relates to a new class of azo dye compounds containing an aryloxazole nucleus and the application of the nuclear non-sulfonated azo dye compounds for the dyeing of organic derivatives of cellulose.

Organic derivatives of cellulose are characterized by an indifferent affinity for the usual cotton and wool dyes, especially the ordinary water soluble dyes. Because of this, it has been necessary to develop new dye compounds suitable for the dyeing or coloration of materials such as textile materials made of or containing an organic derivative of cellulose. It is, accordingly, an object of our invention to provide a new class of azo dyes suitable for the dyeing or coloration of organic derivatives of cellulose.

Another object of our invention is to provide a process for the dyeing or coloration of organic derivatives of cellulose. A further object is to provide a process for the coloration of organic derivatives of cellulose in which the dye or dyes are applied directly to the material undergoing coloration from an aqueous suspension. A still further object is to produce dyeings on organic derivatives of cellulose which are of good fastness to light and washing.

Typical organic derivatives of cellulose include the hydrolyzed as well as the unhydrolyzed cellulose organic acid esters, such as cellulose acetate, cellulose formate, cellulose propionate or cellulose butyrate, and the hydrolyzed as well as the unhydrolyzed mixed organic acid esters of cellulose, such as cellulose acetate-propionate, cellulose acetate-butyrate, and the cellulose ethers, such as methyl cellulose, ethyl cellulose or benzyl cellulose.

The azo dye compounds of our invention have the probable general formula:

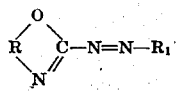

wherein R represents the residue of an aryl nucleus joined through adjacent carbon atoms to the nitrogen and oxygen atoms of the oxazole ring and $R_1$ represents the residue of a member selected from the group consisting of an aryl coupling component of the benzene series, a naphthylamine coupling component, a hydroaromatic coupling component and a heterocyclic coupling component. Advantageously, $R_1$ represents the residue of an aryl coupling component of the benzene series.

The azo dye compounds of our invention constitute valuable dyes which are suitable, in part, for the dyeing or coloring of organic derivatives of cellulose and in part for the dyeing or coloring of cotton, wool and silk. The nuclear non-sulfonated azo dye compounds are of particular value in connection with the dyeing or coloring of organic derivatives of cellulose although they possess some application for the coloration of cotton, wool and silk. The nuclear sulfonated dye compounds possess little or no practical utility for the coloration of organic derivatives of cellulose but are of utililty for the dyeing of cotton, wool and silk. Dyeings ranging in shade from blue to purplish red as well as purple are yielded by the dye compounds of our invention.

We are aware that an azo dye, benzoxazole azo $\beta$-naphthol, has been prepared by coupling diazotized 1-aminobenzoxazole with $\beta$-naphthol. (Journal of the Chemical Society, (1934) page 1187.) This dye compound, however, is not included within the scope of our invention and no claim is made to it. Further, it will be noted that the "Journal of the Chemical Society" article just referred to does not teach that benzoxazole azo $\beta$-naphthol can be employed for dyeing organic derivatives of cellulose and the fact is that the dye has little or no utility for this purpose. The dye compound will stain cellulose acetate an orange-red shade although the shade yielded is feeble and very unstable to light. The most closely related dyes of the present invention, that is, those containing a naphthylamine coupling component, are distinguishable over benzoxazole azo $\beta$-naphthol in a number of respects. First, they possess greater affinity for cellulose acetate and, second, they yield dyeings thereon of greatly increased light fastness. Further, by the use of the naphthylamine coupling components of our invention it is possible to obtain dye compounds yielding desirable blue shades on cellulose acetate whereas these shades are not obtainable using $\beta$-naphthol as the coupling component.

The azo dye compounds of our invention can be prepared by diazotizing a 1-aminoaryloxazole, such as 1-aminobenzoxazole, for example, and coupling the diazonium compound obtained with a coupling component of the character above indicated. The manner of conducting the diazotization and coupling reactions is more fully described hereinafter. Ordinarily, the 1-aminoaryloxazole will be diazotized with nitrous acid in a dilute mineral acid solution. 1-aminoaryloxazoles containing nitro groups, however, will ordinarily be diazotized in an anhydrous medium such as glacial acetic acid or 100% sulfuric acid, for example. Depending upon the nature of the coupling component, coupling may be carried out in an alkaline or acid medium.

Suitable 1-aminoaryloxazole compounds which may be employed in the preparation of the azo dye compounds of our invention include, for example, 1-aminobenzoxazole, 1-amino-5-methylbenzoxazole, 1-amino-5-ethylbenzoxazole, 1-amino-5-chlorobenzoxazole, 1-amino-5-bromobenzoxazole, 1-amino-5-nitrobenzoxazole, 1-amino-5-methoxybenzoxazole, 1-amino-6-β-hydroxyethoxybenzoxazole, 1-amino-4-acetobenzoxazole, 1-amino-4-methylbenzoxazole, 1-amino-6-methoxybenzoxazole, 1-amino-6-ethoxybenzoxazole, 1-amino-3-nitrobenzoxazole, 1-amino-4-chlorobenzoxazole, and a naphthoxazole such as a 1-aminonaphthoxazole, a 1-amino-7-methoxynaphthoxazole and a 1-amino-7-hydroxynaphthoxazole.

For purposes of clarity, the benzoxazole nucleus is numbered as follows:

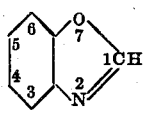

Naphthoxazole may exist in the form of any one of its three isomers. The structural formula and numbering of these isomers are as follows:

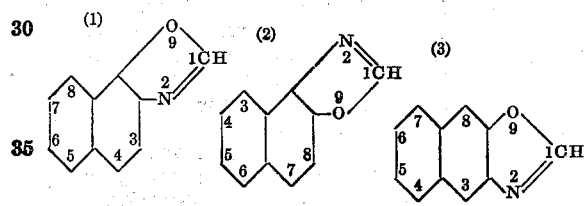

The numbering given for the benzoxazole and naphthoxazole nuclei is that which will be employed throughout.

The following examples illustrate the preparation of the azo dye compounds of our invention:

Example 1

13.4 grams of 1-aminobenzoxazole are dissolved in 150 cc. of water to which 25 cc. of 36% hydrochloric acid has been added and the resulting solution is cooled by the addition of ice, for example, to a temperature approximating 0–5° C. The 1-aminobenzoxazole is then diazotized while maintaining a temperature of 0–5° C. by slowly adding, with stirring, a water solution of 6.9 grams of sodium nitrite.

14.4 grams of 5,5-dimethyl-1,3-cyclohexadione are dissolved in 200 cc. of water containing 30 grams of sodium carbonate and the resulting solution is cooled to 0° C. and the diazo solution prepared above is then slowly added with stirring. Upon completion of the coupling reaction which takes place the mixture is made slightly acid to litmus by the addition of acetic acid and the dye compound which has been formed is recovered by filtration, washed with water and dried. The dye compound obtained has the probable formula:

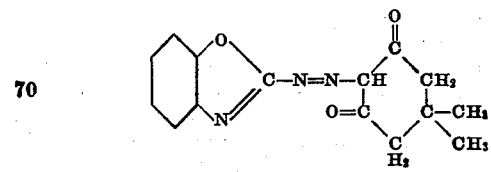

and colors cellulose acetate silk a greenish yellow.

Barbituric acid, thiobarbituric acid, p-cresol, 1-phenyl-3-methyl-5-pyrazolone and 3-methyl-5-pyrazolone, for example, may be substituted for the 5,5-dimethyl-1,3-cyclohexadione of the example and coupled in a similar manner to obtain azo dye compounds of our invention.

Example 2

16.5 grams of 5-methoxy-1-aminobenzoxazole are diazotized in accordance with the method described in Example 1.

18.1 grams of di-β-hydroxyethylaniline are dissolved in cold dilute hydrochloric acid (0–10° C., for example) and the diazo solution prepared as described above is added dropwise with stirring. Following the addition of the diazo solution coupling is completed by adding sodium acetate until the mixture is neutral to Congo red paper after which the dye compound formed is recovered by filtration, washed with water and dried. The dye compound obtained has the formula:

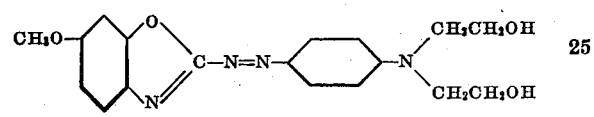

and colors cellulose acetate silk a bluish red shade.

Example 3

16.9 grams of 6-chloro-1-aminobenzoxazole are diazotized in accordance with the method described in Example 1.

23 grams of di-β-hydroxypropyl-α-naphthylamine are dissolved in acetic acid and the resulting solution is cooled to a temperature approximating 0–10° C. The diazo solution prepared above is then added dropwise with stirring and concurrently with the addition of the diazo solution sodium acetate is added at such a rate that the mixture is slightly acid to Congo red paper. Upon completion of the coupling reaction which takes place, water is added and the precipitated dye compound is recovered by filtration, washed with water and dried. The dye compound obtained has the probable formula:

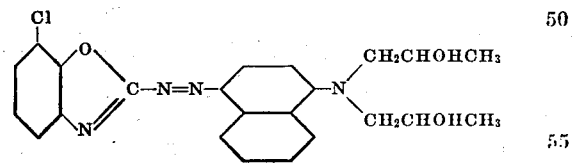

and colors cellulose acetate silk, wool and silk a reddish blue shade.

Example 4

17.9 grams of 5-nitro-1-aminobenzoxazole are dissolved in 200 cc. of glacial acetic acid and 25 cc. of 100% sulfuric acid are added. The resulting mixture is then cooled to as low a temperature as possible without solidification taking place and the amine is diazotized at this low temperature by the addition, with stirring, of a water solution of 6.9 grams of sodium nitrite. Following the diazotization, 10 grams of acetic anhydride are added.

20.9 grams of ethyl-β-hydroxyethylcresidine are dissolved in cold glacial acid and the diazo solution prepared as described above is slowly added with stirring. Coupling is effected and the dye compound worked up as described in Example 3. The dye compound obtained has the probable formula:

$$NO_2-\underset{N}{\underset{\|}{\overset{O}{\diagup}}}C-N=N-\diagdown\diagup-N\underset{CH_3}{\overset{OCH_3}{\diagup}}\underset{CH_2CH_2OH}{\overset{C_2H_5}{\diagdown}}$$

and colors cellulose acetate silk, wool and silk a bluish red shade.

Example 5

19.4 grams of 5-β-hydroxyethoxy-1-aminobenzoxazole are diazotized in accordance with the method described in Example 1.

29.1 grams of $$\underset{OCH_3}{\overset{OCH_3}{\diagup}}-N\underset{CH_2CH_2SO_3Na}{\overset{CH_2CH_2CH_2CH_3}{\diagup}}$$

are dissolved in water, the resulting mixture is cooled to 0° C., and the diazo solution prepared above is slowly added with stirring. A temperature approximating 0–10° C. is maintained throughout the addition of the diazo solution. Concurrently with the addition of the diazo solution there is added an aqueous solution of sodium hydroxide at such a rate that the mixture is neutral to Congo red paper. Upon completion of the coupling reaction which takes place the dye compound formed is precipitated by the addition of sodium chloride, recovered by filtration, washed and dried. The dye compound obtained is water-soluble and has the probable formula:

$$HOCH_2CH_2O-\underset{N}{\underset{\|}{\overset{O}{\diagup}}}C-N=N-\underset{OCH_3}{\diagdown\diagup}-N\underset{CH_2CH_2SO_3Na}{\overset{OCH_3\ CH_2CH_2CH_2CH_3}{\diagup}}$$

This dye compound colors cellulose acetate silk, wool and silk a bluish red shade.

$$\diagdown\diagup-N\underset{CH_2CH_2OSO_3Na}{\overset{CH_2CH_2CH_3}{\diagup}}$$

and $$\diagdown\diagup-N\underset{CH_2CH_2SO_3Na}{\overset{H}{\diagup}}$$

for example, may be substituted for the coupling component employed in the above example and coupling carried out as described above to obtain water-soluble dyes included within the scope of our invention.

Example 6

18.4 grams of $$\underset{N}{\underset{\|}{\overset{O}{\diagup}}}C-NH_2$$

are dissolved in 200 cc. of water to which has been added 25 cc. of 36% hydrochloric acid. The resulting solution is cooled to a temperature approximating 0–5° C. and the amine is then diazotized by slowly adding with stirring a water solution of 6.9 grams of sodium nitrite.

13.7 grams of mono-β-hydroxyethylaniline are dissolved in cold (0–10° C.) dilute hydrochloric acid and the diazo solution prepared above is added dropwise with stirring. After the diazo solution has been added, coupling is completed by adding sodium acetate until the mixture is neutral to Congo red paper. Upon completion of the coupling reaction, the dye compound is recovered by filtration, washed with water, and dried. The dye compound obtained has the probable formula:

$$\underset{N}{\underset{\|}{\overset{O}{\diagup}}}C-N=N-\diagdown\diagup-N\underset{CH_2CH_2OH}{\overset{H}{\diagup}}$$

and colors cellulose acetate silk, wool and silk an orange shade.

In order that our invention may be fully understood, the preparation of a number of intermediate substances used in the manufacture of the azo compounds of our invention is described hereinafter.

Preparation of 1-aminobenzoxazole

This compound may be prepared by reaction between benzoxazole and hydroxylamine as described in Liebig's Annalen, vol. 419, pages 67–69. 1-aminobenzoxazoles substituted in the benzene nucleus may be prepared in similar fashion by the substitution of a benzoxazole, substituted in the benzene nucleus, for benzoxazole in the above reaction.

Preparation of $$\diagdown\diagup\underset{O}{\overset{N}{\diagdown}}CH$$

This compound may be prepared as described in Journal für Praktische Chemie, vol. 73, (1906) pages 438 and 439.

Preparation of $$\diagdown\diagup\underset{N}{\overset{O}{\diagdown}}CH$$

This compound may be prepared as described in Journal für Praktische Chemie, vol. 73, (1906) pages 440 and 441.

Preparation of $$\diagdown\diagup\underset{O}{\overset{N}{\diagup}}CH$$

This compound may be prepared in accordance with the general procedure described in the Journal für Praktische Chemie, vol. 73, pages 438 and 439 by the substitution of the hydrochloride of 2-amino-3-hydroxynaphthalene for the "β-amido-β-naphtholchlorhydrat" of the reference.

The naphthoxazoles, the preparation of which has been described above, may be transformed to their 1-aminonaphthoxazole form by reaction of the naphthoxazoles with hydroxylamine. This reaction may be carried out in analogous fashion to the reaction between benzoxazole and hydroxylamine which is described in Liebig's Annalen, vol. 419, pages 67–69.

The following tabulation further illustrates the compounds included within the scope of our invention together with the color they produce on cellulose acetate. The compounds indicated below may be prepared by diazotizing the amines listed under the heading "Amine" and coupling with the compounds specified in the column entitled "Coupling component". The diazotization and coupling reactions may, for example, be carried out following the general procedure described in Examples 1 to 6 inclusive.

| Amine | Coupling component | Color on cellulose acetate silk |
|---|---|---|
| (1) 1-aminobenzoxazole | (1) 5,5-dimethyl-1,3-cyclohexadione | Greenish-yellow. |
| (2) 1-amino-5-methyl-benzoxazole | do | Do. |
| (3) 1-amino-5-chlorobenzoxazole | do | Do. |
| (4) 1-amino-4-ethylbenzoxazole | do | Do. |
| (5) 1-amino-5-methoxybenzoxazole | do | Do. |
| (6) 1-amino-3-nitrobenzoxazole | do | Do. |
| (7) 1-aminonaphthoxazole | do | Do. |
| (8) 1-amino-7-methoxynaphthoxazole. | do | Do. |
| 1-6 above | (2) 1-3-cyclohexadione | Do. |
| 7-8 above | do | Do. |
| 1-6 above | (3) 5-phenyl-1,3-cyclohexadione | Do. |
| 7-8 above | do | Do. |
| 1-6 above | (4) barbituric acid | Do. |
| 7-8 above | do | Do. |
| 1-6 above | (5) thiobarbituric acid | Orange-yellow. |
| 7-8 above | do | Do. |
| 1-6 above | (6) 1-phenyl-3-methyl-5-pyrazolone | Yellow. |
| 7-8 above | do | Do. |
| 1-6 above | (7) monoglyceryl aniline | Orange. |
| 7-8 above | do | Do. |
| 1-6 above | (8) diphenylamine | Red. |
| 7-8 above | do | Do. |
| 1-6 above | (9) dimethylaniline | Bluish-red. |
| 7-8 above | do | Do. |
| 1-6 above | (10) ethyl-$\beta$-hydroxyethylaniline | Do. |
| 7-8 above | do | Do. |
| 1-6 above | (11) di-$\beta$-hydroxyethyl-m-toluidine | Do. |
| 7-8 above | do | Do. |
| 1-6 above | (12) di-$\beta$-hydroxyethyl-m-chloraniline | Red. |
| 7-8 above | do | Do. |
| 1-6 above | (13) 5-hydroxy-$\beta$-hydroxyethylnaphthylamine | Blue. |
| 7-8 above | do | Do. |
| 1-6 above | (14) 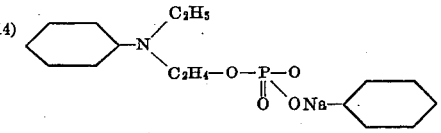 | Rubine. |
| 7-8 above | do | Do. |
| 1-6 above | (15) 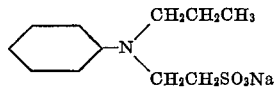 | Purplish-red. |
| 7-8 above | do | Do. |
| 1-6 above | (16) 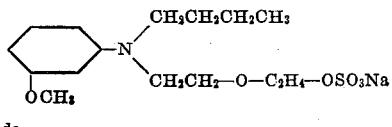 | Do. |
| 7-8 above | do | Do. |
| 1-6 above | (17) 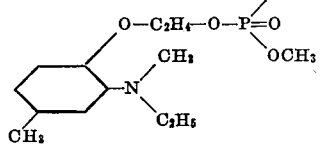 | Do. |
| 7-8 above | do | Do. |
| 1-6 above | (18) 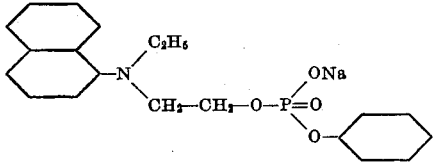 | Rubine |
| 7-8 above | do | Violet. |
| 1-6 above | (14) 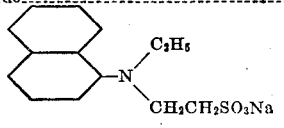 | Rubine. |
| 7-8 above | do | Violet. |

From Examples 1 to 6 inclusive and the tabulation given above, it will be apparent that the aryl nucleus of the aryl oxazole nucleus can contain substituents. The aryl nucleus may be substituted, for example, with a hydroxyl group, an aryl group, an alkoxy group, a nitro group or an

It will be understood that the examples given herein, as well as the substituent groups listed above, are given by way of illustration and are not to be considered as limitations on the invention.

The coupling components designated 14, 17 and 18 in the foregoing tabulation may be prepared as described in our copending applications Serial Nos. 225,198 and 225,199, filed August 16, 1938, wherein azo dye compounds containing such substituents are specifically described and claimed. The preparation of the remaining coupling components disclosed in the present application is believed clear and a description of their preparation is accordingly unnecessary.

The azo dye compounds of our invention are, for the most part, relatively insoluble in water. Those compounds which are insoluble in water may be advantageously employed for the direct dyeing of textile materials by grinding the dye to a fine powder, intimately mixing it with a suitable dispersing or solubilizing agent, and adding the resulting mixture to water or a dilute solution of soap in water to form an aqueous dyebath. Following this known preparation of the dyebath, the textile materials to be dyed may be added to the dyebath and the dyeing operation conducted in known fashion. The dye compounds of our invention which are water soluble do not, of course, require the use of a dispersing or solubilizing agent but may be applied to silk, wool and (depending upon the material and position of the water-solubilizing group) organic derivatives of cellulose textile materials from an aqueous solution of the dye which may contain salt. For a more complete description as to how the azo dye compounds of our invention may be employed in dyeing or coloring operations, reference may be had to our U. S. Letters Patent No. 2,115,030, issued April 26, 1938. For a more detailed description as to how the water-soluble azo dyes of our invention may be employed for the coloration of textile materials made of or containing organic derivatives of cellulose, silk and wool or mixtures of these, reference may be had to our U. S. Letters Patent No. 2,107,898, issued February 8, 1938.

We claim:

1. The azo dye compounds having the general formula:

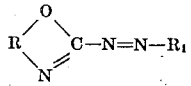

wherein R represents the residue of a member selected from the group consisting of an aryl nucleus of the benzene series and an aryl nucleus of the naphthalene series joined through adjacent carbon atoms to the nitrogen and oxygen atoms of the oxazole ring and $R_1$ represents the residue of a member selected from the group consisting of an aryl coupling component of the benzene series, a naphthylamine coupling component, a hydroaromatic coupling component and a heterocyclic coupling component.

2. The azo dye compounds having the general formula:

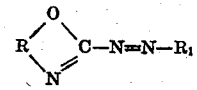

wherein R represents the residue of an aryl nucleus of the benzene series joined through adjacent carbon atoms to the nitrogen and oxygen atoms of the oxazole ring and $R_1$ represents the residue of a member selected from the group consisting of an aryl coupling component of the benzene series, a napthalene coupling component, a hydroaromatic coupling component and a heterocyclic coupling component.

3. The azo dye compounds having the general formula:

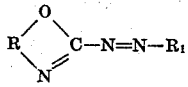

wherein R represents the residue of a member selected from the group consisting of an aryl nucleus of the benzene series and an aryl nucleus of the naphthalene series joined through adjacent carbon atoms to the nitrogen and oxygen atoms of the oxazole ring and $R_1$ represents the residue of an aryl coupling component of the benzene series.

4. The azo dye compounds having the general formula:

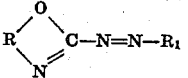

wherein R represents the residue of an aryl nucleus of the benzene series joined through adjacent carbon atoms to the nitrogen and oxygen atoms of the oxazole ring and $R_1$ represents the residue of a hydroxyalkylamine coupling component of the benzene series.

5. The azo dye compounds having the general formula:

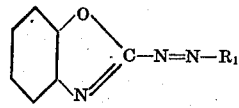

wherein $R_1$ represents the residue of a member selected from the group consisting of an aryl coupling component of the benzene series, a naphthylamine coupling component, a hydroaromatic coupling component and a heterocyclic coupling component.

6. The process of coloring material made of or containing an organic derivative of cellulose which comprises applying thereto a nuclear nonsulfonated azo dye compound having the general formula:

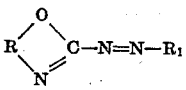

wherein R represents the residue of a member selected from the group consisting of an aryl nucleus of the benzene series and an aryl nucleus of the naphthalene series joined through adjacent carbon atoms to the nitrogen and oxygen atoms of the oxazole ring and $R_1$ represents the residue of a member selected from the group consisting of an aryl coupling component of the benzene series, a naphthylamine coupling component, a hydroaromatic coupling component and a heterocyclic coupling component.

7. The process of coloring material made of or containing an organic derivative of cellulose which comprises applying thereto a nuclear non-sulfonated azo dye compound having the general formula:

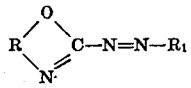

wherein R represents the residue of an aryl nucleus of the benzene series joined through adjacent carbon atoms to the nitrogen and oxygen atoms of the oxazole ring and $R_1$ represents the residue of an aryl coupling component of the benzene series.

8. The process of coloring material made of or containing an organic acid ester of cellulose which comprises applying thereto a nuclear non-sulfonated azo dye compound having the general formula:

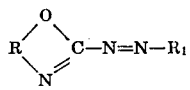

wherein R represents the residue of a member selected from the group consisting of an aryl nucleus of the benzene series and an aryl nucleus of the naphthalene series joined through adjacent carbon atoms to the nitrogen and oxygen atoms of the oxazole ring and $R_1$ represents the residue of a member selected from the group consisting of an aryl coupling component of the benzene series, a naphthylamine coupling component, a hydroaromatic coupling component and a heterocyclic coupling component.

9. The process of coloring a cellulose acetate which comprises applying thereto a nuclear non-sulfonated azo dye compound having the general formula:

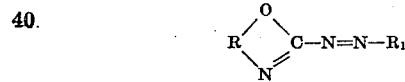

wherein R represents the residue of a member selected from the group consisting of an aryl nucleus of the benzene series and an aryl nucleus of the naphthalene series joined through adjacent carbon atoms to the nitrogen and oxygen atoms of the oxazole ring and $R_1$ represents the residue of a member selected from the group consisting of an aryl coupling component of the benzene series, a naphthylamine coupling component, a hydroaromatic coupling component and a heterocyclic coupling component.

10. The process of coloring a cellulose acetate which comprises applying thereto a nuclear non-sulfonated azo dye compound having the general formula:

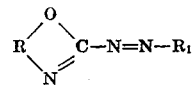

wherein R represents the residue of an aryl nucleus of the benzene series joined through adjacent carbon atoms to the nitrogen and oxygen atoms of the oxazole ring and $R_1$ represents the residue of an aryl coupling component of the benzene series.

11. Material made of or containing an organic derivative of cellulose colored with a nuclear non-sulfonated azo dye compound having the general formula:

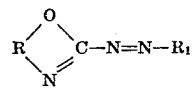

wherein R represents the residue of a member selected from the group consisting of an aryl nucleus of the benzene series and an aryl nucleus of the naphthalene series joined through adjacent carbon atoms to the nitrogen and oxygen atoms of the oxazole ring and $R_1$ represents the residue of a member selected from the group consisting of an aryl coupling component of the benzene series, a naphthylamine coupling component, a hydroaromatic coupling component and a heterocyclic coupling component.

12. A cellulose acetate colored with a nuclear non-sulfonated azo dye compound having the general formula:

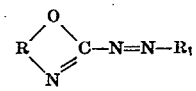

wherein R represents the residue of an aryl nucleus of the benzene series joined through adjacent carbon atoms to the nitrogen and oxygen atoms of the oxazole ring and $R_1$ represents the residue of a member selected from the group consisting of an aryl coupling component of the benzene series, a naphthylamine coupling component, a hydroaromatic coupling component and a heterocyclic coupling component.

JAMES G. McNALLY.
JOSEPH B. DICKEY.